Aug. 25, 1925.

L. HALL 1,550,694

AUTOMATIC GAS HEAT CONTROLLER

Filed May 31, 1923   2 Sheets-Sheet 1

Aug. 25, 1925.

L. HALL 1,550,694

AUTOMATIC GAS HEAT CONTROLLER

Filed May 31, 1923     2 Sheets-Sheet 2

Patented Aug. 25, 1925.

1,550,694

UNITED STATES PATENT OFFICE.

LEES HALL, OF BALTIMORE, MARYLAND, ASSIGNOR TO ALFRED W. CHANNING, INC., OF NEW YORK, N. Y., A CORPORATION OF NEW YORK.

AUTOMATIC GAS-HEAT CONTROLLER.

Application filed May 31, 1923. Serial No. 642,717.

*To all whom it may concern:*

Be it known that I, LEES HALL, a subject of the King of England, residing at Baltimore, State of Maryland, have invented a new and useful Improvement in Automatic Gas-Heat Controllers, of which the following is a specification.

This invention relates to automatic gas heat controllers which govern the flow of gas or other like vapors used as a fuel to be burned and thereby generate heat, for, as in one instance the melting of metals as shown in my pending application on a melting furnace, Serial No. 598,608.

The objects which I seek to attain by my invention are, first, to provide a rod which expands and contracts by the intensity of the heat of the burning gases; second, to provide within a closed valve body, a slidable piston to control the flow of gas; and, third, to provide means for controlling the flow of gas within a predetermined range of heat temperatures.

Figure 1:
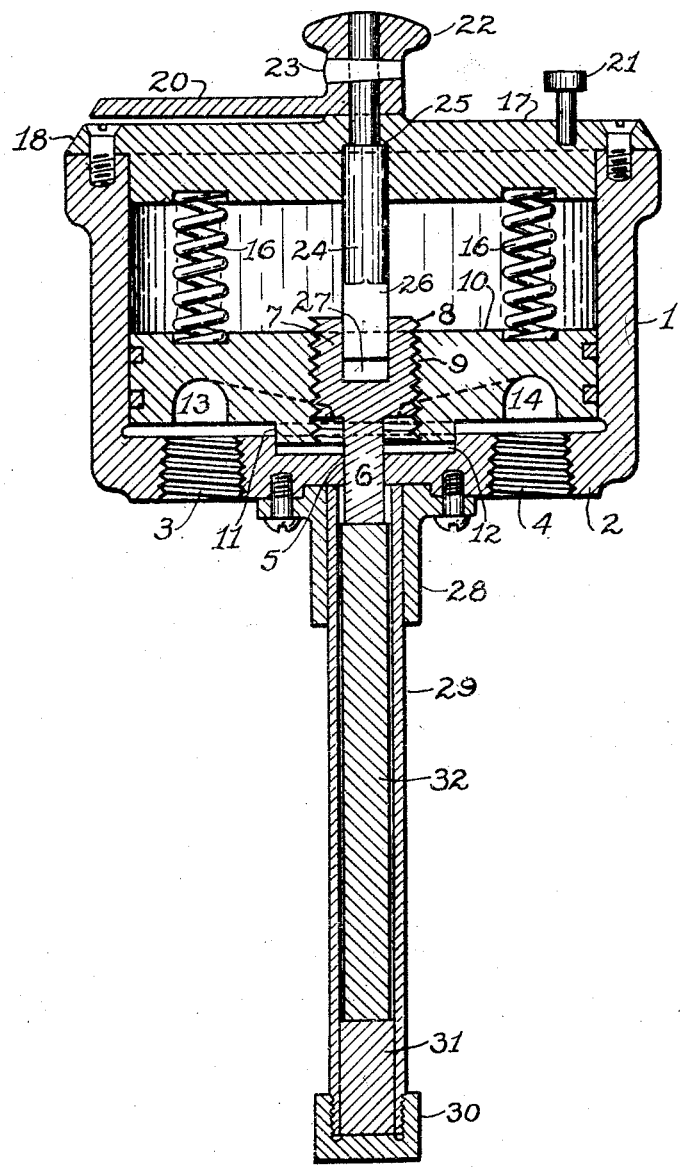
Figure 2:
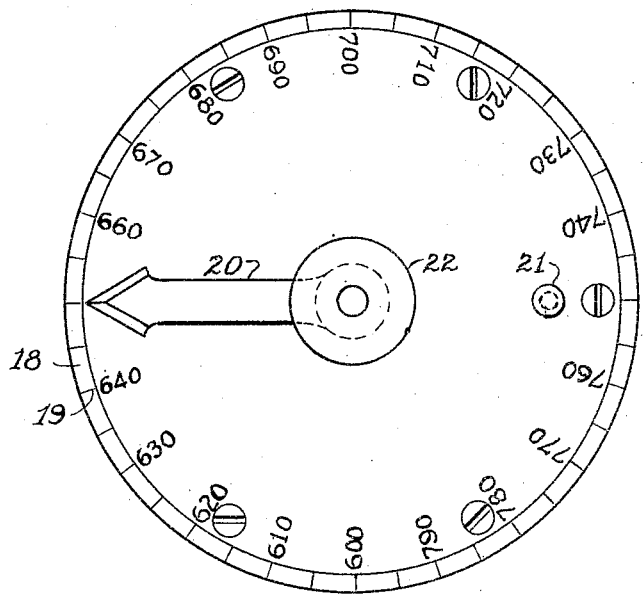
Figure 3:
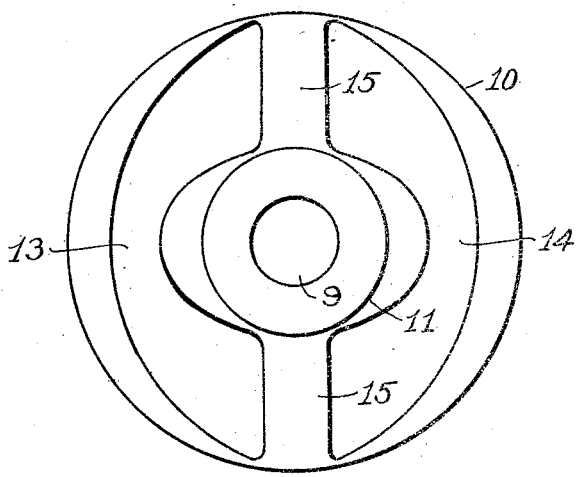

Other objects and advantages of my invention will be apparent from the following description when read in connection with the accompanying drawings wherein, Figure 1 is a sectional elevation of the entire heat controller; Fig. 2 is a top plan view of the controller body cover showing the graduations thereon and the indicator for manually controlling the amount of gas fed to burners; and Fig. 3 is a bottom view of the controller piston showing the gas passages therein.

With more particular reference to the drawings, wherein similar characters of reference denote similar parts throughout the several views:

The numeral 1 denotes a hollow cylindrical controller body having a bottom wall 2 with screw threaded apertures 3 and 4 for respectively receiving a gas inlet and a gas outlet pipe, and a centrally disposed hole 5 for the passage therethrough of a stem 6 integral with a controller piston regulator 7 which is exteriorly threaded as at 8, Fig. 1, to engage the centrally disposed interiorly threaded hole 9 of a controller piston 10 having on its under side an extension 11 which is slidable in the counterbore 12 of the controller body 1. On the under side of the controller piston 10 there are provided a gas inlet passage 13 and a gas outlet passage 14 located above the gas inlet opening 3 and the gas outlet opening 4 as shown in Fig. 1 and are in width the same as the internal diameters of the gas inlet and the gas outlet pipes, and of sufficient height to cause the passages to have an area equivalent to the internal diameters of each pipe. To maintain a constant speed of gas throughout the controller, the gas passages 13 and 14 are constant in area throughout their lengths. To confine the controller piston 10 to a small movement to regulate the flow of gas through the controller at a small change in the heat temperatures, the gas inlet and the gas outlet passages are made to gradually increase in width as shown in Fig. 3, and to decrease in height as they recede from the location over the gas inlet and the gas outlet pipes. The area between the surfaces 15 on the under side of the controller piston and the inner surface of the bottom wall 2 of the controller body governs the amount of gas passing through the controller. When the furnace to which the controller is attached gets above the desired temperature, the surfaces 15 and the inner surface of the bottom wall 2 come in contact by the dropping of the controller piston 10, thereby stopping the flow of gas through the controller.

In the bore of the body 1 are compression springs 16 provided to assist in forcing downwardly the piston 10 by means of the lower ends of the said springs bearing on the upper surface of the piston and the upper ends of said springs bearing against the under side of the controller body cover 17 bolted to the upper end of the body 1. The controller body cover 17 has an outer circumferential beveled edge 18 as shown in Fig. 1 on which graduations 19 are marked as shown in Fig. 2, for manually setting with the indicator 20, the degree of heat temperature at which the controller is to operate. The degrees of heat of the pre-determined range of temperatures within which the controller is to operate are marked at the graduations 19 but this range can be changed to higher or lower temperatures if desired, by removing the indicator stop pin 21 inserted in the top of the cover 17 to confine the movement of the indicator to the range of degrees as designated on the cover, and then raising or lowering the piston 10 to permit a greater or a lesser volume of gas to pass through the controller by means of rotating the knob 22 of the indicator 20 fastened by the pin 23 to the regulator stem 24. The regulator stem 24 passing through the cover 17 has a shoulder 25 at its upper end to prevent any vertical movement of the said stem and has a square section lower end which fits into and is slidable in a hole 27 similar in section in the regulator 7. The manual rotating of the stem 24 rotates the regulator 7 on its exterior threads 8, which, fitting into the interiorly threaded hole 9 of the piston 10 causes the same to raise or lower according to the direction of rotation given to the knob 22.

For actuating the piston 10 and thereby automatically controlling the amount of gas to pass through the controller, there is bolted to the under side of the bottom wall 2 a tubular body 28 in the bore of which is fastened an expanding and contracting tube 29 the lower end of which is exteriorly threaded to receive a cap 30, and at the bottom of the said tube a plug 31 is inserted on which rests a non-expanding tube or rod 32 on the top of which the stem 6 of the regulator 7, supporting the piston 10, rests.

The method of operating the controller is as follows:

The controller body 1 is first fastened to a furnace, of which the heat for the melting of metals is to be automatically controlled, with the expanding and contracting tube 29 extended into the furnace in such a manner that the said tube will be in contact with the burning gas which has previously passed through the controller to burners appropriately located in the furnace, or, the expanding and contracting tube 29 may be located to be immersed in the molten metal when the controller is used on a furnace for the melting of metals. The indicator 20 is then set at the degree of heat by the graduations 19 at which the furnace is to operate and the gas on being ignited at the burners, raises the temperature in the furnace thereby causing the tube 29 to expand which action permits the refractory non-expanding rod 32, slidable in the bore of the tube 29, to lower. The piston 10 is supported on the top of the rod 32 by the stem 6 of the regulator 7 and is lowered with the aforesaid rod thereby decreasing the supply of gas to the burners as the temperature rises above the degree of heat at which the controller has been set to maintain. To assist the piston 10 in its downward movement, the compression springs 16 bear against the top surface thereof. While I prefer to use a plurality of compression springs, a single spring encircling the stem 24 can readily be used for the same function. The cooling of the furnace causes the tube 29 to contract which action lifts the non-expanding rod 32 thereby raising the piston 10 to permit a greater volume of gas to pass through the controller to the burners.

I claim:

1. An automatic gas controller comprising a hollow body portion having a counterbore, a gas inlet opening and a gas outlet opening in the bottom wall thereof, an adjustable spring pressed piston mounted within said body portion and provided with gas passages in the lower face thereof and with a centrally arranged extension interrupting said passages and adapted to seat in said counterbore when said piston is in its lowermost position whereby flow of gas through said passages is restricted or stopped, an expansible and contractible tube secured to said body portion, a non-expansible rod slidably mounted in said tube and operatively connected with said piston, and means secured to said piston and adapted to position the same within the body portion whereby the degree of heat at which the controller is to operate is controlled.

2. In an automatic gas heat controller, the combination of a hollow cylindrical body, a piston slidable therein and having a centrally disposed interiorly threaded hole, gas passages in the lower face of the said piston, an exteriorly threaded piston regulator fitting into the interiorly threaded hole of the piston and having on its under side a stem and in its top side a socket, a regulator stem with its lower end square in section and fitting into the socket of the piston regulator, compression springs bearing against the top side of the piston, a body cover having a beveled circumferential outer edge on which graduations are marked and apertured for the passage therethrough of the regulator stem, an indicator fastened to the regulator stem, and an indicator stop pin inserted in the top side of the body cover.

In testimony whereof, I have signed my name to this specification.

LEES HALL.